United States Patent Office 2,944,567
Patented July 12, 1960

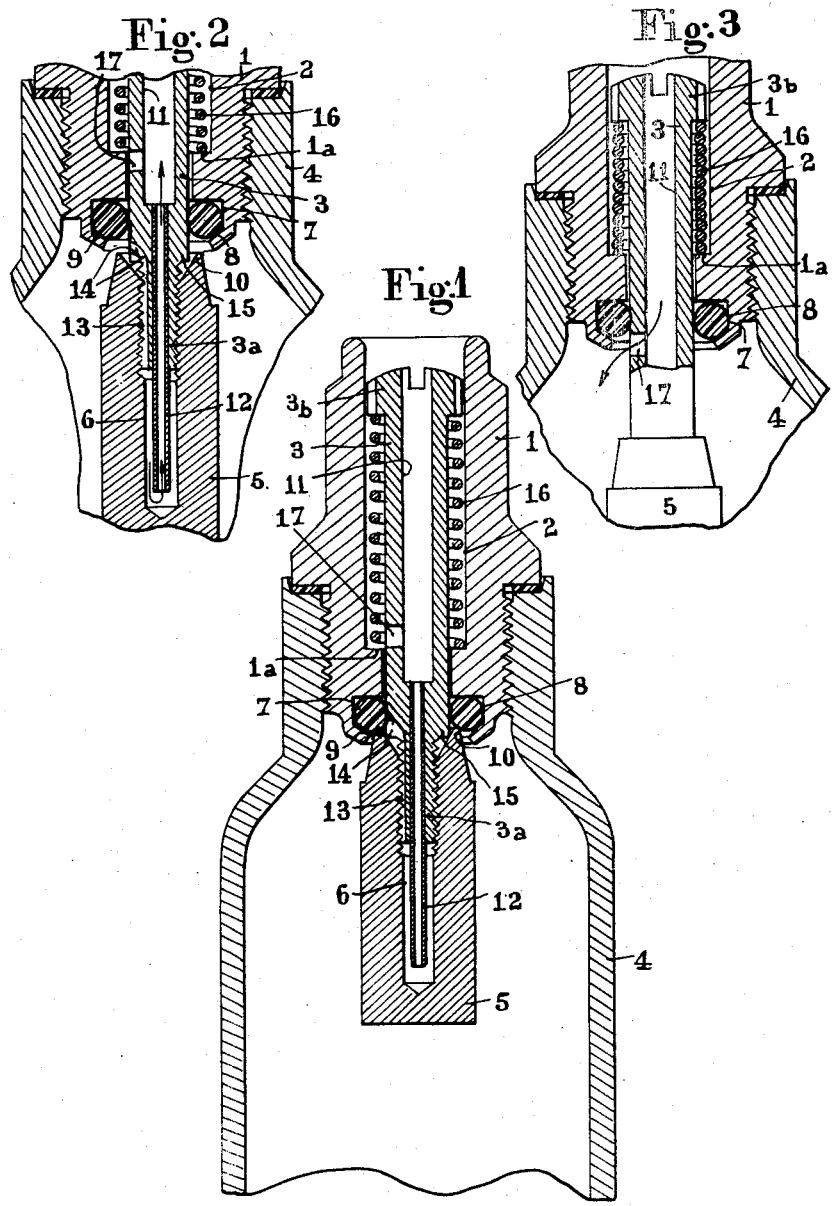

2,944,567

VALVE FOR HIGH-PRESSURE GAS CONTAINER

Maurice Jaskarzec, 9 ter Rue Lucien Sampaix,
Paris, France

Filed Sept. 23, 1957, Ser. No. 685,495

Claims priority, application France Sept. 22, 1956

3 Claims. (Cl. 137—625.3)

The present invention has for its object a valve stopper for high-pressure gas container, for example for a compressed gas cartridge or cylinder.

It is known that the high pressures (more than 50 kg. per sq. cm.) of compressed gas in these cartridges or cylinders, for example of $CO_2$, generally necessitate the use of expansion valves for the use of the gas at low pressure and in small quantities, as is precisely necessary in the various uses of $CO_2$ under pressure, for example for the inflation of tyres or pneumatic mattresses and canoes, or even for the atomisation of a liquid or pulverulent product.

Now expansion valves are delicate, expensive and bulky apparatuses. Thus the necessity of their use is a particularly irksome disadvantage on small compressed gas cartridges or cylinders.

This is why the present invention has for its object a valve stopper for cylinders or cartridges of gas under pressure, having the purpose of permitting a small delivery of gas without using an expansion valve. This stopper also has the object of permitting regulation of the duration of the escape of the gas, that is the quantity expelled, at will. This valve stopper, which is designed to be very easy to manipulate, also has the object of permitting easy filling of the cartridge without necessitating the dismantling of any part.

Thus in general the valve stopper according to the invention has the object of rendering possible the use of small cylinders of $CO_2$ under high pressure, without expansion valve, for various uses requiring a small delivery of gas: inflation; fire extinguishing, atomisation, etc.

The valve stopper according to the invention is characterised in that its valve is constituted by a member carried by a hollow rod mounted for sliding in the body of the stopper and forming a control push rod for separating the valve from its seating, this valve being hollow and its internal cavity communicating on the one hand with the hollow rod which opens to the exterior and encloses a hollow capillary needle, and on the other hand with the interior of the container when the valve is separated from its seating against appropriate resilient means tending normally to hold the valve on its seating.

Thus when the valve is separated from its seating, the gas can pass into the internal cavity thereof, whereafter it must pass through the hollow needle to reach the exterior, passing through the axial bore of the push rod. Under these circumstances the expansion of the gas is ensured under optimum conditions, by virtue of the hollow needle, which may be calibrated. Furthermore the delivery of the gas is kept very small, and an optimum result is obtained, without an expansion valve.

In accordance with another characteristic feature of the valve stopper according to the present invention, the push rod comprises one or more radial holes opening into its axial bore at such a point that after complete pushing in of the push rod, this hole or these holes is or are situated beyond the joint, and communicate with the interior of the cartridge, which permits direct communication between the cartridge and the exterior. This thus permits filling very easily and rapidly cartridges equipped with a stopper according to the invention, after the push rod has been pushed in fully.

The invention will be better understood from the following description of an embodiment of valve stopper. This description is given with reference to the accompanying drawing, given simply by way of non-limitative example, and wherein:

Figure 1 is an axial section of such a stopper, its members being in the rest position;

Figures 2 and 3 are partial views in axial section of the same stopper, the movable members of which are represented respectively in the opening and in the filling of the container.

This stopper comprises a body 1 provided with an axial bore 2 passing through it from end to end. In this bore there is mounted for sliding a push rod 3, one end 3a of which extends to the interior of the cylinder or cartridge 4, on the orifice of which the stopper is mounted. This end 3a is threaded and carries a metallic element 5 comprising a blind tapped hole 6 for screwing onto this end. The lower part of this blind hole forms an internal cavity remaining free after mounting of the piece 5 on the end 3a of the push rod.

The inner end of the body 1 comprises a groove 7 in which there is disposed a resilient ring joint 8. This joint is held in place by a nut or by fitting of the lower edge 9 of the body 1. The internal wall of the joint 8 bears in sealing fashion about the push rod 3.

Facing the joint 8, the upper face of the piece 5 carries a circular rib 10 adapted to bear against this joint, in order to close the cartridge in a perfectly gas-tight fashion.

The push rod comprises an axial bore 11 passing through it from end to end, and its end 3a carries a hollow needle 12 communicating with this bore. This needle also opens into the internal cavity 6 of the piece 5.

A longitudinal recess 13 is provided in the threading of the end 3a of the push rod, this recess constituting a free passage communicating with the enclosed space 6. This passage opens to the surface of the push rod by a bevelled recess 14 which extends it and is formed in the shoulder 15. As may be noted from the drawing, this recess 14 is situated in the interior of the space defined by the rib 10. Thus, the recess 13, 14 cannot communicate with the interior of the container when the rib 10 is applied against the joint 8, that is to say when the valve is closed.

The valve is held in this position by a helical spring 16 mounted about the push rod 3 between a shoulder 3b of the outer end of the latter and a shoulder 1a of the body 1.

Finally the push rod comprises one or more radial holes 17 opening into the axial bore 11. This hole or these holes 17 is or are provided at such a level that when the push rod is pushed in fully (see Figure 3), they come beyound the joint 8. These holes 17 then place the bore 11 in direct communication with the interior of the cartridge 4. Thus the cartridge communicates directly with the exterior through a passage of normal section, permitting its easy and rapid filling without dismantling of any part.

The present device is obviously controlled by partial pushing in of the push rod 3. In fact this pushing in separates the piece 5 from the joint 8. Now as soon as the rib 10 is separated from this joint the compressed gas of the cartridge can pass into the recess 13—14 to reach the internal cavity 6 of the piece 5. Thereupon the gas must pass through the hollow needle to reach the bore 11 of the push rod and open to the exterior (see Figure 2).

The hollow needle forms a capillary hole and has an internal section of extremely small diameter, so that the delivery of gas may be as small as desired. The gas expands into the bore 11 of greater diameter than the needle, then into the channels leading to the jet or other member for use of the apparatus to which the gas cartridge is applied. Thus the expansion of the gas is ensured without necessitating the presence of a special expansion valve. This is particularly advantageous since the present device is of small bulk and is inexpensive.

Naturally the magnitude of the gas delivery can be regulated according to the circumstances involved, by the provision of a hollow needle 12 of greater or smaller internal section. The needle 12 may have an internal diameter of 0.1 mm. and an external diameter of 0.4 mm., so that the device is of very small bulk, and is very light.

This device has the advantage of permitting of obtaining a very small delivery of gas, avoiding any wastage of gas and rendering possible the prolonged use of any apparatus with intermittent function, using a cartridge of compressed gas, for example a projection or atomisation apparatus, a spray, a portable tyre-inflator, etc.

In order to arrest the escape of the gas, it is sufficient to release the push rod 3. The pressure of the gas on the valve body 5 returns it to its seating, pressing the rib 10 upon the joint 8. This action is further reinforced by the action of the return spring 16, which ensures rapid and perfectly gas-tight closure, even if the pressure on the interior of the cylinder has decreased considerably.

Thus the stopper avoids any leakage or escape, as the gas can only issue when the push rod is voluntarily pushed in for a specific useful purpose. Thus this stopper permits of using cylinders or cartridges of gas under pressure in association with sprays or atomisers, or other devices which must be able to operate for a long period, for more or less frequent and intermittent periods of use. Said stopper also permits of obtaining for a long period refrigeration through gas expansion, due to the small delivery of gas from the stopper.

Finally, as has already been indicated, the present valve stopper permits very easy filling of the cartridges on which it is mounted. In fact the complete pushing in, and not partial pushing in, of the push rod 3 permits of causing the cartridge to communicate with the exterior through one or more holes 17 of relatively large diameter (see Figure 3).

Naturally, the present device may be subjected to any desired modifications, and may be the object of any appropriate applications.

What I claim is:

1. Valve system adapted to be secured to a container filled with a fluid under a relatively high pressure a relatively moderate output of fluid under reduced pressure, which comprises a hollow body constituting the body of the device and a valve shank formed with an axial outlet passage of relatively small diameter and mounted for sliding movement in an axial bore of said body, said shank extending beyond said bore into a high pressure inlet area, a valve member screwed on the inner end of said valve shank and formed with a blind axial cavity in which extends the corresponding smooth portion of said shank so as to leave between it and the wall an annular chamber of relatively small cross-sectional area, a narrow lateral longitudinal passage formed between the screw-threaded portion of said sliding shank and the tapped portion of said valve member, said narrow passage extending from said annular chamber and opening into the upper face of said valve member, said valve member movable between a valve opening and a valve closing position, an annular sealing gasket retained in an annular groove formed in the lower end portion of said hollow body and seated on said valve member when the latter is in valve closing position, thereby acting jointly as a sealing packing around said sliding shank, as a seat for said valve member and, in its valve closing condition, resilient means disposed between said sliding shank and said hollow body for urging said valve member to its valve closing seated position, whereby when said shank is depressed against the resistance of said resilient means and against the fluid pressure acting against the bottom of said valve member, said valve member will be unseated to move into the valve opening position and enable a thin stream of fluid from said high pressure inlet area to flow through said narrow passage in which its output is controlled and its pressure reduced by the resulting throttling action, whereafter said fluid expands slightly in said annular chamber and said end axial cavity of said valve member, and subsequently flows through the axial passage of said sliding valve shank without undergoing any detrimental expansion during the whole of this path, and finally penetrates into said axial outlet passage of said shank.

2. A valve system as set forth in claim 1, wherein said sealing gasket is a toroidal ring of plastic resilient material.

3. Valve system as set forth in claim 1, wherein said sliding shank is formed with at least one radial hole in communication with said axial outlet passage adapted to be used for loading said high pressure area and disposed at an intermediate point along said shank, such that a partial sinking thereof which permits a normal utilization of the device, will ensure the preliminary obturation of said hole, whereas a more pronounced sinking of said shank will cause said hole and said axial outlet passage to move past said sealing gasket thereby placing said hole and said axial outlet passage in direct communication with said high pressure area.

References Cited in the file of this patent
UNITED STATES PATENTS

| | | |
|---|---|---|
| 769,688 | Cederstrom | Sept. 13, 1904 |
| 2,035,953 | Fernholz | Mar. 31, 1936 |
| 2,631,814 | Abplanalp | Mar. 17, 1953 |
| 2,686,652 | Carlson et al. | Aug. 17, 1954 |